Nov. 29, 1966 — C. F. BEELER — 3,288,206
AIR CONDITIONING SYSTEM
Filed March 4, 1966 — 3 Sheets-Sheet 1
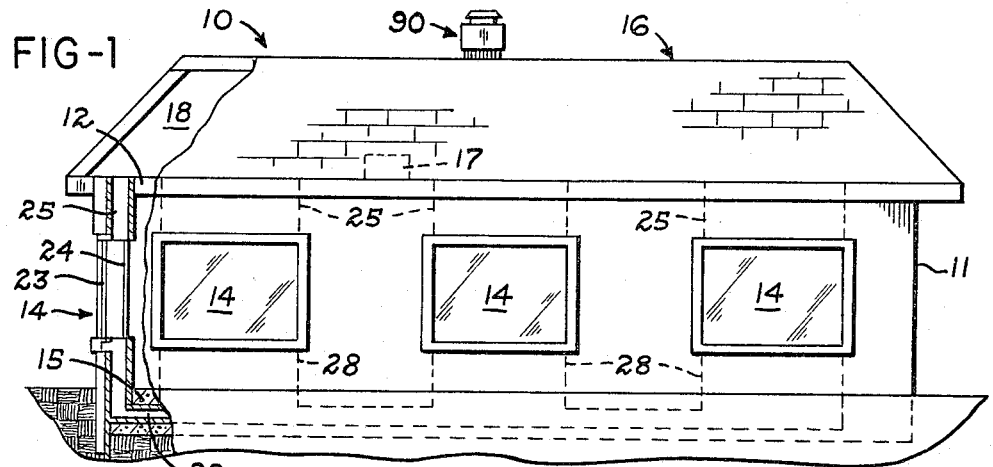
FIG-1
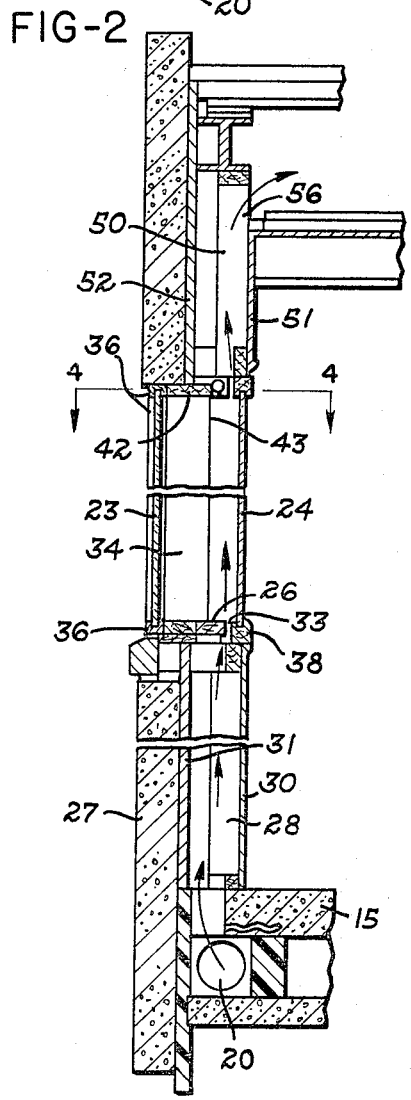
FIG-2
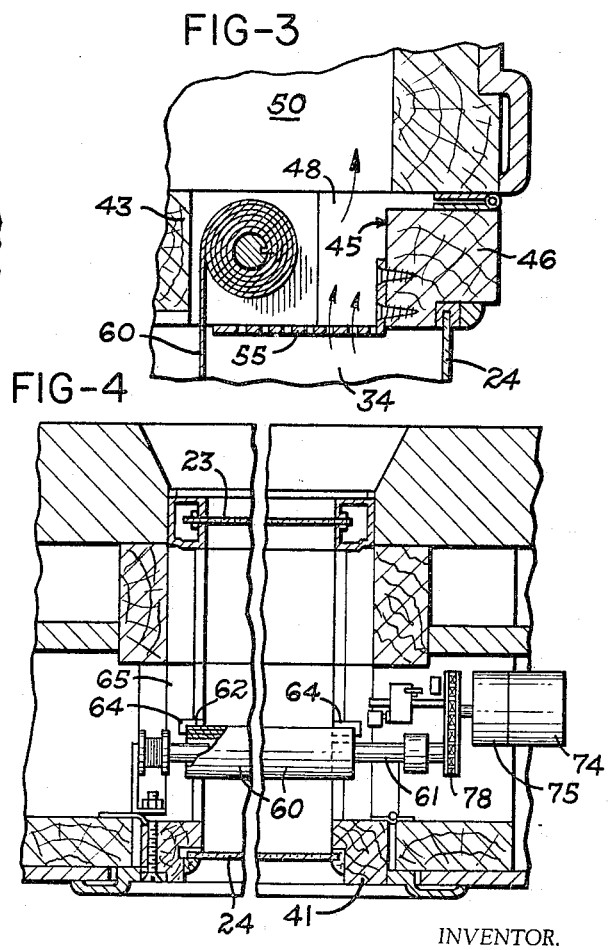
FIG-3
FIG-4
INVENTOR.
CHARLES F. BEELER
BY
Marechal, Biebel, French & Bugg
ATTORNEYS Nov. 29, 1966　　　　　C. F. BEELER　　　　　3,288,206
AIR CONDITIONING SYSTEM
Filed March 4, 1966　　　　　　　　　　　　3 Sheets-Sheet 2
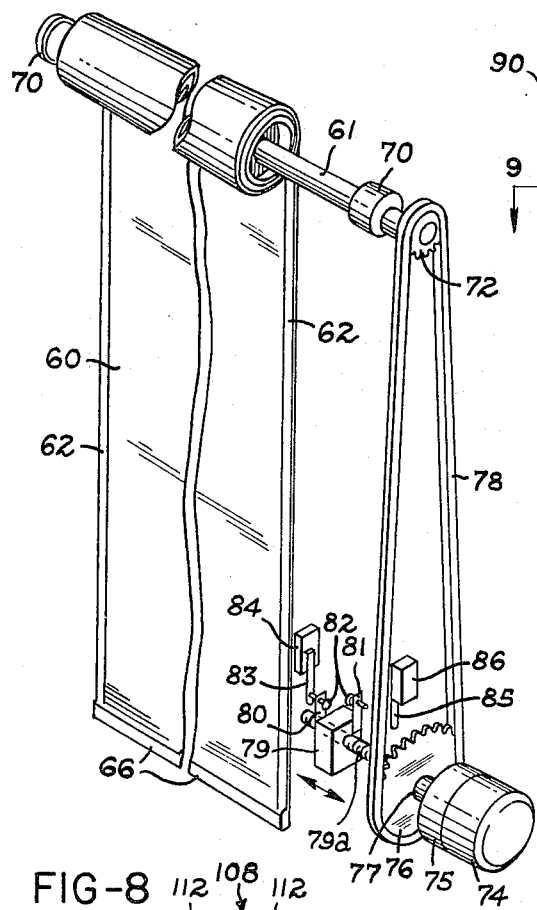
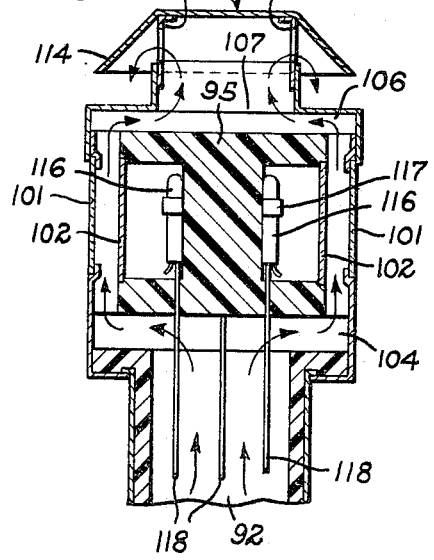
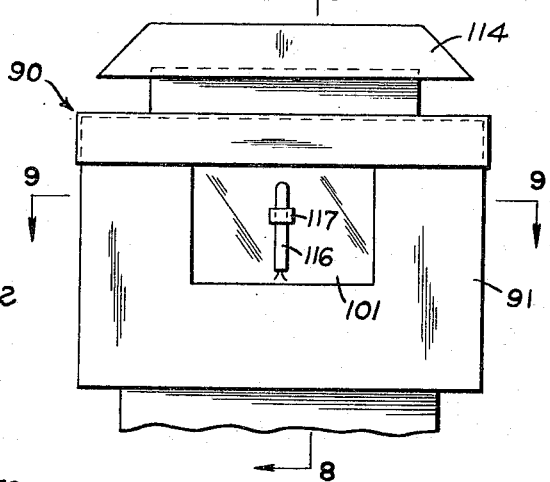
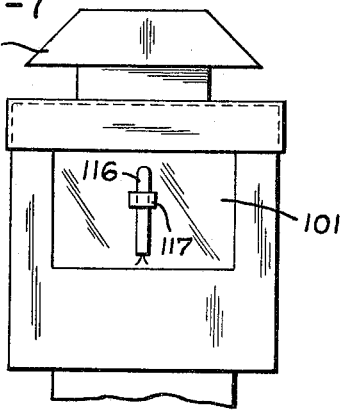
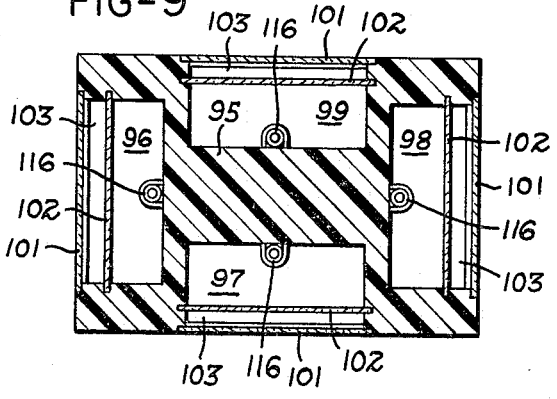

Nov. 29, 1966  C. F. BEELER  3,288,206
AIR CONDITIONING SYSTEM
Filed March 4, 1966  3 Sheets-Sheet 3

United States Patent Office 3,288,206
Patented Nov. 29, 1966

3,288,206
AIR CONDITIONING SYSTEM
Charles F. Beeler, Box 896, Hamilton, Ohio
Filed Mar. 4, 1966, Ser. No. 531,973
10 Claims. (Cl. 165—39)

This application is a continuation-in-part of my copending application Serial No. 372,165, filed June 3, 1964, now Patent No. 3,247,894, granted April 26, 1966.

This invention relates to the art of air conditioning and particularly to apparatus for automatically compensating for the flow of radiant sunlight into a building. The aforesaid copending application is directed to an air conditioning system wherein separate interior and perimeter heating and cooling systems are provided. The perimeter system acts to negate the flow of heat or cold through the walls of the building, and thus the interior system only compensates for the heat load generated within the structure, for example, the heat given off by lights, human beings, and the like. This invention is particularly directed to the apparatus for sensing the radiant sun load on a building and automatically positioning blinds in the window to thus block the flow of radiant sunlight through the windows of a building.

Accordingly, an important object of this invention is to provide an automatic control system which lowers a window blind in response to a preset amount of sunlight passing through the window.

Another object of this invention is to provide a single sensing device for an entire building which accurately and efficiently senses the sunlight which is being imposed upon the building, and in particular to provide such a sensing device which simulates the sun load on the windows of the building by separately sensing the heat coming from a plurality of directions correlated with the sun loads being imposed on the walls of the building.

A further object of this invention is to provide an automatic sensing and controlling device which automatically lowers blinds on each side of the building depending upon the amount of sunlight shining on that side of the building, and particularly to provide a control system which can be manually overridden by a person wishing to look out the window.

Another object of this invention is to provide an automatic blind mechanism of the aforesaid type which can be automatically lowered and which is power operated, and particularly to provide such a control system which is simple in design and therefore dependable in operation for efficient operation after long periods of inactivity.

Other objects and advantages of the invention will be apparent from the following description, the accompanying drawings and the appended claims.

In the drawings:

FIG. 1 is a side elevation view partially broken away of a building utilizing the system in accordance with the invention;

FIG. 2 is a sectional view through one side of the building showing the manner in which the blind is positioned;

FIG. 3 is an enlarged sectional view showing an upper portion of a window;

FIG. 4 is a sectional view taken along the line 4—4 of FIG. 2;

FIG. 5 is a perspective view of the blind and its operating mechanism;

FIG. 6 is a side elevation view of the sunlight sensing device;

FIG. 7 is an end view of the sensing device shown in FIG. 6;

FIG. 8 is a sectional view taken along the line 8—8 of FIG. 6;

FIG. 9 is another sectional view taken along the line 9—9 of FIG. 6; and

Figure 10:
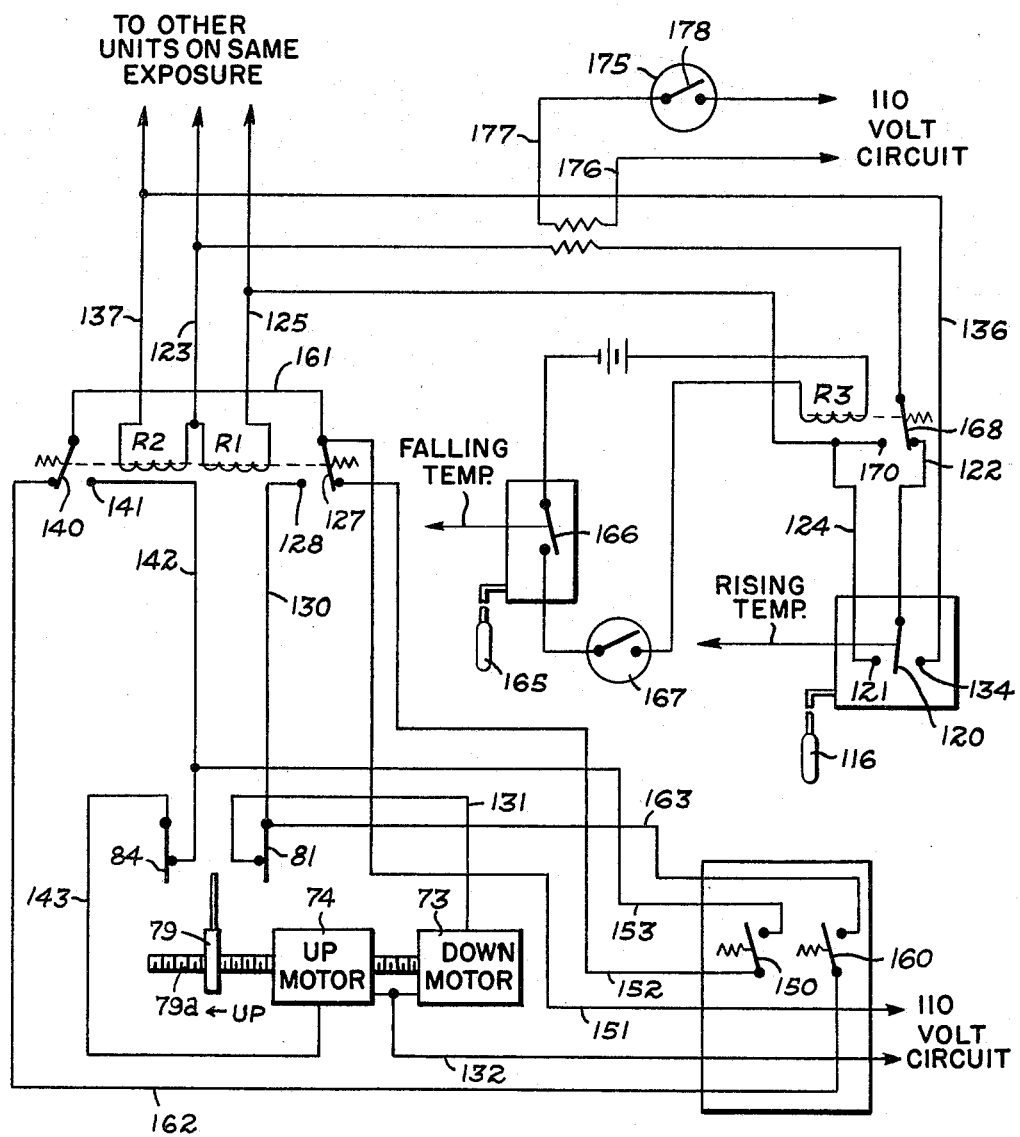
FIG. 10 is a schematic illustration of the electrical circuitry.

Referring to the drawings wherein a preferred embodiment of the invention is shown, FIGS. 1 and 2 illustrate schematically a typical dwelling or structure 10 in which the invention is utilized. While the structure is in the form of a small home having a number of separate rooms, it is within the scope of this invention to use the system with buildings having very large floor area and many separate rooms or enclosures. The air conditioning system includes a perimeter system which substantially eliminates any heat transfer through the side walls 11 and ceiling 12 of the structure, including the passage of radiant heat energy through the windows 14. A separate interior system may be used to control the temperature, humidity and ventilation within the interior of the structure, but this interior system forms no part of the present invention and is fully described in the aforesaid copending application.

The exterior walls 11 of the structure 10 are well insulated so that there is negligible heat flow therethrough, and there similarly will be only a small negligible amount of heat flow into the structure through the floor 15 thereof. Heretofore the outside air temperature affects the interior air temperature primarily by heat flow through the windows 14, the ceiling 12 and roof 16. While this perimeter system per se is not part of this invention it will be described herein to facilitate description of other portions of the invention.

The perimeter system thus includes a heat exchanger-blower unit 17 mounted in the attic space 18 above the ceiling 12, or any other convenient location in the building. The unit 17 is connected by the duct 20 to each of the windows 14 and the air passes upwardly between parallel panes of glass 23 and 24 of each of the windows 14, and into the attic space 18 through the ducts 25 directly above each of the windows 14. The attic space 18 acts as a plenum or collection chamber since all of the air from the ducts 20 flows through the windows 14 and into this space. By moving a sufficiently large amount of air through the system, the air in the attic space 18 also acts to prevent the flow of heat between the roof 16 and the ceiling 12. The inlet of the unit 17 receives air only from the attic space 18 so that this perimeter system is substantially a closed system, and this is possible since the air in this system does not contact human beings so that it is not a requirement that the humidity thereof be regulated.

Each of the windows 14 includes a sill 26 having the inner and outer glass windows 23 and 24 supported thereon in spaced relationship, as shown in FIG. 2. The wall structure 27 immediately below the sill 26 includes a lower vertical passage 28 defined between the inner and outer walls 30 and 31. The passage 28 communicates at its lower end with the supply duct 20, and at the upper end through the slot 33 in the sill 26 with the space 34 between the windows 23 and 24.

The outer window 23 is supported around its entire periphery by the metal molding members 36 whereas the inner window 24 is held in place by the wooden molding strips 38 which are nailed in place and to hold the glass in the window frame member 41 (FIG. 4). The structure at the top of each window 14 includes an upper plate 42 having its innermost edge portion 43 spaced from the parallel edge 45 of the horizontal member 46 to define a slot 48 through which air from the space 34 will pass upwardly into the upper passage 50 defined between the inner and outer walls 51 and 52. The lower entrance of the slot 48 is covered by a perforated shield 55 (FIG. 3) secured to the wooden member 46 mounted horizontally above the window 14 for the purpose of improving the appearance of the slot entry. The upper end of the passage 50 connects to the attic space 18 above the ceiling 12 through the opening 56.

Each window 14 also has an automatic shade 60 disposed between the window glasses 23 and 24 for restricting the passage of sunlight into the interior of the structure 10 as well as the outflow of heat in the winter months. These shades are preferably translucent and white or egg shell in color so that some light but little sun radiation passes therethrough. Each shade 60 is mounted on a roller 61 (FIG. 5) and the side edges 62 of the shade ride in the vertical grooves 64 formed in the side members 65. The leading edge 66 (FIG. 5) of the blind 60 may be weighted and contacts the sill 26 when the blind is fully extended so that it completely closes the associated window 14. In this closed position, the air flows between the inner glass 24 and the blind 60 so that the temperature adjacent the inner window 24 is closely controlled.

The automatic operating mechanism for the shade 60 is shown in FIG. 5 and includes the bearing members 70 which support the opposite ends of the roller 61. The roller 61 has a chain sprocket 72 secured rigidly to one end thereof, and this sprocket is driven by the drive motors 73 and 74 having a gear reduction unit 75 associated therewith which rotates the chain sprocket 76 mounted on its drive shaft 77. The drive chain 78 interconnects the sprockets 72 and 76 so that rotation of the motors 73 and 74 effect rotation of the shade roller 61 to raise and lower the shade 60.

Also mounted on the drive shaft 77 of the gear reduction unit 75 is a member 79 which moves along the threaded portion 79a of the shaft 77 through the similarly threaded bore in the center thereof. This member has a pair of upwardly extending arms 80 and 81 each of which has an adjustment screw 82 thereon. As the motor 73 rotates to lower the shade 60, the arm 80 contacts the operating lever 83 of the switch 84 when the shade is lowered to terminate operation of this motor. When the shade is being raised, the operation of the motor 74 is terminated by contact of the arm 81 with the operating lever 85 of the switch 86, which occurs when the shade is in its fully retracted position to block the flow of sunlight through the associated window.

The motors 73 and 74 and thus the blind 60 are actuated in response to the sunlight passing through the windows by the sensing device 90 mounted on the roof 16 of the building 10 so that the sun rays are received at the same intensity and at the same angle as does the entire building. The sensing device 90 includes a sheet metal housing 91 which has an opening 92 (FIG. 8) in the bottom thereof in communication with the inlet duct 92 leading from the attic 18 so that air at a preset temperature passes into the sensing device at all times.

The sheet metal side walls support the Styrofoam divider member 95 which defines portions of four separate cut out portions 96, 97, 98 and 99. Each of the cut out portions has an outer glass pane 101 secured adjacent the outer portion thereof and with a similar inner glass pane 102 secured inwardly therefrom to define the air passages 103 therebetween, as shown in FIG. 8. The air thus flows from the duct 92 through the space 104 below the member 95, and then upwardly through each of the passages 103 to the space 106 above the member.

An opening 107 is provided in the upper portion of the housing 91 with a cover 108 thereon having openings 110 on the downwardly extending flanges 112 thereof so that the air flowing from the passages 103 is exhausted to the atmosphere. The downwardly sloped shield 114 on the cover 108 blocks rain and snow from easily getting into the interior of the housing 91.

The glass panes 101 and 102 are of a size and are spaced apart a distance which is proportional to the corresponding dimensions of the panes 23 and 24 of the windows 14. Thus the amount of sunlight passing through any two of the panes 101 and 102 is directly proportional to the amount of sunlight passing through windows 14 on the same side of the building. The inner panes 102 define closed spaces in the cut out portions provided between the inner pane and the central portion of the divider member 95, and elongated bulb elements 116 filled with volatile liquid are mounted centrally therein by the brackets 117 which surround the center of the bulb elements 116. The bulb elements are conventional devices for making or breaking electrical circuit in response to the rise or fall of temperature thereof, and the pressure conduits 118 extend therefrom to operate an electrical switch.

The bulb elements 116 sense the temperature of the air in the sensing device 90 so that the shade 60 is lowered when a certain high temperature is reached and raises when the temperature drops below a preset level. These preset levels may overlap so that the shade 60 is not actuated by small temperature changes. Because the sensing device 90 separately senses the heat and radiation on four sides, the shades 60 on the four sides of the building are controlled separately.

In operation of the perimeter system, the heat exchanger-blower unit 17 continually circulates air through the perimeter duct 20 at the base of each of the exterior walls 11. Thus any heat flowing into or from the interior of the structure 10 at the base of these walls will be absorbed by the air flowing through this duct. The air flows from the perimeter duct 20 upwardly through each of the windows 14, in the manner already described, and then upwardly into the attic space 18 which acts as a plenum or collection chamber thereby restricting the flow of heat through the windows 14, and the roof 16 to the ceiling 12. The air in the attic space 18 is drawn back into the unit 17, and the cycle is again completed. In this manner the flow of heat into or from the structure 10 through the various walls, ceiling, and windows is substantially negated so that the only consideration in heating or cooling the interior thereof, is the heat generated by the presence of human beings and by the lights in the structure.

The electrical circuitry of FIG. 10 is best described in connection with the operation of the system. Thus, assuming that the system is properly installed, a rise in the temperature within the sensing device 90 causes the bulb elements 116 to move the switch 120 against the contact 121 so that a circuit is completed through the conductors 122, 123, 124 and 125 to energize the relay R1. The relay R1 moves the switch 127 against the contact 128 so that a circuit to the down motor 73 is completed through the conductors 130 131 and 132 and causing the shade 60 to be lowered. The motor 73 continues to run until the limit switch 81 is contacted by the member 79 whereby the circuit between the electrical conductors 130 and 131 is opened and operation of the motor 73 is terminated.

When the temperature within the sensing device 90 is lowered for example when the sun is hidden by clouds or the like the switch 120 is moved against the contact 134 to complete a circuit to the relay R2 through the electrical conductors 122 123 136 and 137. Energization of the relay R2 moves the switch 140 into engagement with the contact 141 causing a circuit to the up motor 74 to be completed through the conductors 142 143 and 132 so that the motor 74 raises the shade 60. When the shade reaches its raised position the member 77 opens the limit switch 84 which in turn opens the circuit to and deenergizes the motor 74.

A manual over-ride switch 150 is provided for the up motor 74 so that the shade 60 can be manually raised if desired. When this switch is depressed a circuit is completed through the conductors 151, 152, 153, 142, 143, and 132 to the motor 74. Similarly, the shade 60 can be lowered by depressing the manual switch 160 which completes a circuit to the motor 73 through the conductors 151, 161, 162, 163, 131, and 132. The switches 150 and 160 are of the momentary contact type in that they are closed only during the time that manual pressure is applied thereto. Thus the shade 60 can be positioned in a partially raised or lowered position.

To reduce heat loss from the building, the shades 60 are lowered when temperature is below a certain preset value and during the time that the building occupants do not require vision through the windows. Thus, the temperature sensing element 165 closes the switch 166 when the temperature outside the building reaches the present value and the timer 167 permits the circuit to the relay R3 to be closed during the periods set thereon, for example, during the hours between 8 p.m. and 7 a.m. when the building is unoccupied. The relay R3 moves the switch 168 against the contact 170 to complete a circuit to the down motor 73, as described above.

A timer 175 in the power supply conductors 176 and 177 for the relay R1 and R2 permits operation of the automatic system only during specific intervals, for example, 30 seconds out of each 30 minute period. Thus the automatic system overrides the manual switches 150 and 160 only during the short period when the timer 175 closes the switch 178. Thus the manual switches override the automatic system for the remainder of the 30 minute period.

In summary, when the sun is not shining the sensing device will position the shades 60 in their open position, unless the control unit has been overridden by a desire to close the blinds notwithstanding absence of sunlight. Once the sun begins to shine, the sensing device 90 properly senses the same, and causes the shades 60 to be moved to their lowered position wherein they block the flow of sun rays in the room thereby eliminating another source of heat addition to the interior of the structure.

Since the shade 60 is provided with manual controls therefor, it may be desirable to lower the shades during cold weather, especially in the hours that the structure is unoccupied or during the night hours, so that the window structures will be even more effective in reducing the flow of heat therethrough. When the shades are lowered the flow of air between the glass panes 31 and 33 is between the shade 60 and the inner pane 31 so that the air moves in a restricted path to reduce heat transfer through the windows. The shade 60 also acts as an insulating device to reduce heat flow therethrough.

The sensing device thus accurately senses the sunlight and radiation which is being absorbed by each side of the building structure. In response to the signals generated by the sensing device, the shades 60 on each exposure of the building are appropriately positioned to reduce the flow of heat or sunlight through the windows. While the invention has been described as being used on a four-sided building, it is within the scope of the invention to adapt the sensing device to buildings for any number of sides or exposures. Moreover, obstructions such as trees or buildings, which block the flow of sunlight onto one exposure can also be compensated for in the sensing device by appropriately masking the openings to the sensing device.

The invention has thus provided an automatic control system which lowers blinds or shades in response to a preset amount of sunlight passing through the window. The sensing device simulates the sun load on all sides of the building to appropriately position the shades, and means are provided for manually over-riding the automatic control system so that the shade may be raised or lowered as desired independently of the automatic controls.

While the form of apparatus herein describe constitutes a preferred embodiment of the invention, it is to be understood that the invention is not limited to this precise form of apparatus, and that changes may be made therein without departing from the scope of the invention which is defined in the appended claims.

What is claimed is:

1. An air conditioning system comprising, a window disposed on one side of the building, blind means disposed adjacent said window for blocking the flow of radiant sun energy through said window, a device for sensing a predetermined amount of sunlight passing through said window to move said blind to its blocking position, said device including an outer housing having one side thereof open to receive sunlight at the same angle as said window, an inner compartment in said outer housing, said inner compartment being closed except for an opening in one side thereof which extends in the same direction as said one side of said outer housing for receiving sunlight from the same direction as said window, said opening having a configuration which is a proportional reduction of said window so that said inner compartment receives an amount of sunlight which is proportioned in amount and intensity to the sunlight passing through said window, temperature sensing means for sensing the temperature in said inner compartment and thereby determining the intensity of sunlight passing into said opening and through said window, and control means for lowering said blind means in response to a preset amount of sunlight passing into said compartment and for raising said blind means when the sunlight passing through said window falls below said preset amount.

2. An air conditioning system as defined in claim 1 wherein a plurality of windows are provided in the building and said blind means being provided for each of said windows.

3. An air conditioning system as defined in claim 1 wherein said control means includes overriding manual means for raising and lowering said blind means.

4. An air conditioning system as defined in claim 1 wherein said control means is operable during short periods of time at preset time intervals.

5. An air conditioning system as defined in claim 1 wherein said control means automatically lowers said blind means when the temperature outside the building is below a preset level and during a period of time set on a timing device when it is not desirable to have unobstructed vision through said window.

6. An air conditioning system for a building having a plurality of side walls comprising, at least one window disposed in at least two of said side walls, blind means disposed adjacent each of said windows for blocking the flow of radiant sun energy through said windows, a device for sensing a predetermined amount of sunlight passing through each of said windows, said device including an outer housing having the sides thereof open to receive sunlight at the same angle as said side walls of said building, a plurality of inner compartments in said outer housing with at least one compartment being disposed in alignment with the windows on each of said side walls, said inner compartments being closed except for an opening in the sides thereof which receive sunlight from the same direction as said windows, said openings having configurations which are proportional reductions of said windows so that said inner compartments receive amounts of sunlight which are proportioned in amount and intensity to the sunlight passing through said windows, temperature sensing means for sensing the temperature in each of said inner compartments and thereby determining the intensity of sunlight passing into said associated opening, and control means for selectively lowering said blind means in response to a present amount of sunlight passing into said compartments and for raising said blind means when the sunlight passing through said windows falls below said preset amount.

7. An air conditioning system as defined in claim 6 wherein said control means includes manually actuated means for raising and lowering the blind means independent of said temperature sensing means.

8. An air conditioning system as defined in claim 6 wherein said outer housing is mounted on the roof of the building.

9. An air conditioning system as defined in claim 6 wherein said control means includes means for automatically lowering said blind means when the building is normally unoccupied and when the outside temperature is below a preset level.

10. Window structure for use in a building having a perimeter air conditioning system comprising, a window frame defining a window opening in the building, inner and outer spaced glass window panes mounted in said opening in the building, inner and outer spaced glass window panes mounted in said opening for closing the same, an inlet opening in one portion of said window frame for flow of air uniformly through the space between said glass panes, an outlet opening in another portion of said frame for venting air from said space between said panes, means for connecting an air supply to said inlet opening for flow of air at a preset temperature through said space to negate the flow of heat between said panes, blind means disposed in said space for blocking the flow of radiant sun energy through said inner glass panes, a device for sensing a predetermined amount of sunlight passing through said window to move said blind means to its blocking position including an outer housing having one side thereof open to receive sunlight at the same angle as said outer panes, an inner compartment in said outer housing, said inner compartment being closed except for an opening in one side thereof which extends in the same direction as said one side of said outer housing for receiving sunlight from the same direction as said outer panes, said opening having a configuration which is a proportional reduction of the area so that said inner compartment receives an amount of sunlight which is proportioned in amount and intensity to the sunlight passing through said outer panes, said one side and opening having glass panes therein spaced apart a distance proportional to the distance between said panes and being made of glass similar to said panes, temperature sensing means for sensing the temperature in said inner compartment and thereby determining the intensity of sunlight passing into said opening and through said panes, and means for lowering said blind means in response to a predetermined sensing by said temperature sensing means.

References Cited by the Examiner

UNITED STATES PATENTS 2,179,873  11/1939  Anderson et al. _____ 98—10
3,013,397  12/1961  Meckler _____ 165—133

ROBERT A. O'LEARY, *Primary Examiner.*

C. SUKALO, *Assistant Examiner.*